(12) United States Patent
Farley et al.

(10) Patent No.: US 9,084,075 B2
(45) Date of Patent: Jul. 14, 2015

(54) TRACKING MANAGEMENT SYSTEMS AND METHODS

(75) Inventors: Richard O. Farley, San Diego, CA (US); Dilip Krishnaswamy, San Diego, CA (US); Gang Ding, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 13/233,985

(22) Filed: Sep. 15, 2011

(65) Prior Publication Data
US 2013/0070636 A1 Mar. 21, 2013

(51) Int. Cl.
*H04W 4/00* (2009.01)
*H04L 29/08* (2006.01)
*G06Q 10/08* (2012.01)
*H04W 84/20* (2009.01)

(52) U.S. Cl.
CPC ............. *H04W 4/006* (2013.01); *G06Q 10/083* (2013.01); *H04L 67/12* (2013.01); *H04W 4/008* (2013.01); *H04W 84/20* (2013.01); *Y02B 60/50* (2013.01)

(58) Field of Classification Search
USPC .......................................... 370/328, 336, 338
See application file for complete search history.

(56) References Cited

U.S. PATENT DOCUMENTS

| 7,193,512 | B1 | 3/2007 | Coulthard |
|---|---|---|---|
| 8,060,610 | B1* | 11/2011 | Herington ...................... 709/226 |
| 8,095,120 | B1* | 1/2012 | Blair et al. .................... 455/416 |
| 8,478,360 | B2 | 7/2013 | Soliman |
| 2003/0124979 | A1* | 7/2003 | Tanada et al. .................... 455/41 |
| 2005/0048954 | A1* | 3/2005 | Gortz et al. ................. 455/414.1 |
| 2006/0053216 | A1* | 3/2006 | Deokar et al. ................. 709/223 |
| 2006/0245351 | A1* | 11/2006 | Pande et al. .................. 370/216 |
| 2008/0040244 | A1 | 2/2008 | Ricciuti et al. |
| 2008/0062941 | A1* | 3/2008 | Rhee et al. ..................... 370/338 |
| 2008/0101311 | A1* | 5/2008 | Bernhard et al. ............. 370/342 |
| 2008/0117860 | A1* | 5/2008 | Rodriguez et al. ............ 370/328 |
| 2009/0106571 | A1* | 4/2009 | Low et al. ..................... 713/310 |

(Continued)

FOREIGN PATENT DOCUMENTS

EP 1833197 A1 9/2007
JP H09171571 A 6/1997

(Continued)

OTHER PUBLICATIONS

Stathopoulous, T. et al., "End-To-End Routing for Dual-Radio Sensor Networks", INFOCOM 2007.26TH IEEE International Conferences on Computer Communications. IEEE, p. 2252, May 6-12, 2007.

(Continued)

*Primary Examiner* — Brandon Renner
(74) *Attorney, Agent, or Firm* — Jeffrey D. Jacobs

(57) ABSTRACT

A collaborative method for a node includes forming a local network with at least one other node using a lower power subsystem; selecting a master node from among the local network based on a first set of criteria; and communicating with a back end server over a wireless wide area network (WWAN) using a higher power subsystem. An apparatus may include a first subsystem for communicating with a local network; and a second subsystem having an active mode and an inactive mode, the second subsystem for communicating with a wireless wide area network (WWAN) when in the active mode, the apparatus selecting the active mode or inactive mode based on a set of criteria.

38 Claims, 6 Drawing Sheets

(56) References Cited

U.S. PATENT DOCUMENTS

| | | | |
|---|---|---|---|
| 2009/0252136 A1* | 10/2009 | Mahany et al. | 370/338 |
| 2009/0276531 A1* | 11/2009 | Myka et al. | 709/227 |
| 2009/0310522 A1* | 12/2009 | Bertonis et al. | 370/280 |
| 2010/0067420 A1 | 3/2010 | Twitchell, Jr. | |
| 2010/0128634 A1* | 5/2010 | Rhee et al. | 370/254 |
| 2010/0309913 A1* | 12/2010 | Herodotou et al. | 370/390 |
| 2010/0316028 A1* | 12/2010 | Allen et al. | 370/336 |
| 2011/0077909 A1 | 3/2011 | Gregory et al. | |

FOREIGN PATENT DOCUMENTS

| | | |
|---|---|---|
| JP | 2003198567 A | 7/2003 |
| JP | 2004064615 A | 2/2004 |
| JP | 2006157666 A | 6/2006 |
| JP | 2008544687 A | 12/2008 |
| JP | 2010056678 A | 3/2010 |
| WO | 2006067271 A1 | 6/2006 |
| WO | WO2008020223 A1 | 2/2008 |
| WO | 2009111180 A1 | 9/2009 |

OTHER PUBLICATIONS

Alippi C., et al., "Energy-aware wireless-wired communications in sensor networks", Sensors, 2009 IEEE, IEEE, Piscataway, NJ, USA Oct. 25, 2009, XP031618929, pp. 83-88.

International Search Report and Written Opinion—PCT/US2012/055544—ISA/EPO—Dec. 13, 2012.

* cited by examiner

TRACKING MANAGEMENT SYSTEMS AND METHODS

BACKGROUND

1. Field

This disclosure relates generally to tracking systems and methods. More particularly, the disclosure relates to collaborative tracking systems and methods.

2. Related Art

Asset management has always been an important part of commerce. For example, tracking packages is important to organizations of all kinds, whether it be a company tracking inventory to be sold in its stores, or a package delivery provider tracking packages being transported through its delivery network. To provide quality service, an organization typically creates and maintains a highly organized network for tracking its packages. Effective management of such networks allows for lower cost, reduced delivery time, and enhanced customer service.

In addition to tracking packages, parties that ship and receive packages may also need information regarding the conditions of the packages such as the temperature and humidity of the package. For example, a customer that has ordered a box of wine may want to monitor the temperature of the contents of the box to determine if the temperature and/or humidity go above or below a set range. Likewise, the party that ships the package may also want to monitor the conditions of the package to ensure that the content arrives in the proper condition.

Technological advances have enabled items to be tracked in ways that far exceed the functionality of a simple list. A rich information framework now can be applied to describe the item's interaction with its surroundings, such as transportation and custodial handoffs.

Bar codes are one way organizations keep track of items. A retailer, for example, may use bar codes on items in its inventory. For example, items to be sold in a retailer's store may each be labeled with a different bar code. In order to keep track of inventory, the retailer typically scans the bar code on each item. In addition, when an item is sold to a consumer, the bar code for that item is scanned.

Similarly, a package delivery provider may utilize bar codes by associating a bar code with packages to be delivered to a recipient. For example, a package may have a bar code corresponding to a tracking number for that package. Each time the package goes through a checkpoint (e.g., the courier taking initial control of the package, the package being placed in a storage facility, the package being delivered to the recipient, etc.), the package's bar code may be scanned. Bar codes, however, have the disadvantage that personnel must manually scan each bar code on each item in order to effectively track the items.

Radio-frequency identification (RFID) tags are an improvement over typical bar codes. RFID tags do not require manual scanning that is required by typical bar codes. For example, in a retail context, an RFID tag on an inventory item may be able to communicate with an electronic reader that detects items in a shopping cart and adds the cost of each item to a bill for the consumer. RFID tags have also been used to track things such as livestock, railroad cars, trucks, and even airline baggage. These tags typically only allow for basic tracking and do not provide a way to improve asset management using information about the environment in which the items are tracked. Sensor-based tracking systems are also known which can provide more information than RFID systems.

Shippers, carriers, recipients, and other parties often wish to know the location, condition, and integrity of shipments before, during, and after transport to satisfy quality control goals, meet regulatory requirements, and optimize business processes.

SUMMARY

In various embodiments, tracking devices are configured to maximize system life (e.g., collective battery charge) by selecting one or more appropriate nodes (master tracking devices) from among a network of tracking devices for WWAN communication. Additional embodiments provide for redundancy in the system to enable theft detection.

DETAILED DESCRIPTION

Figure 1:
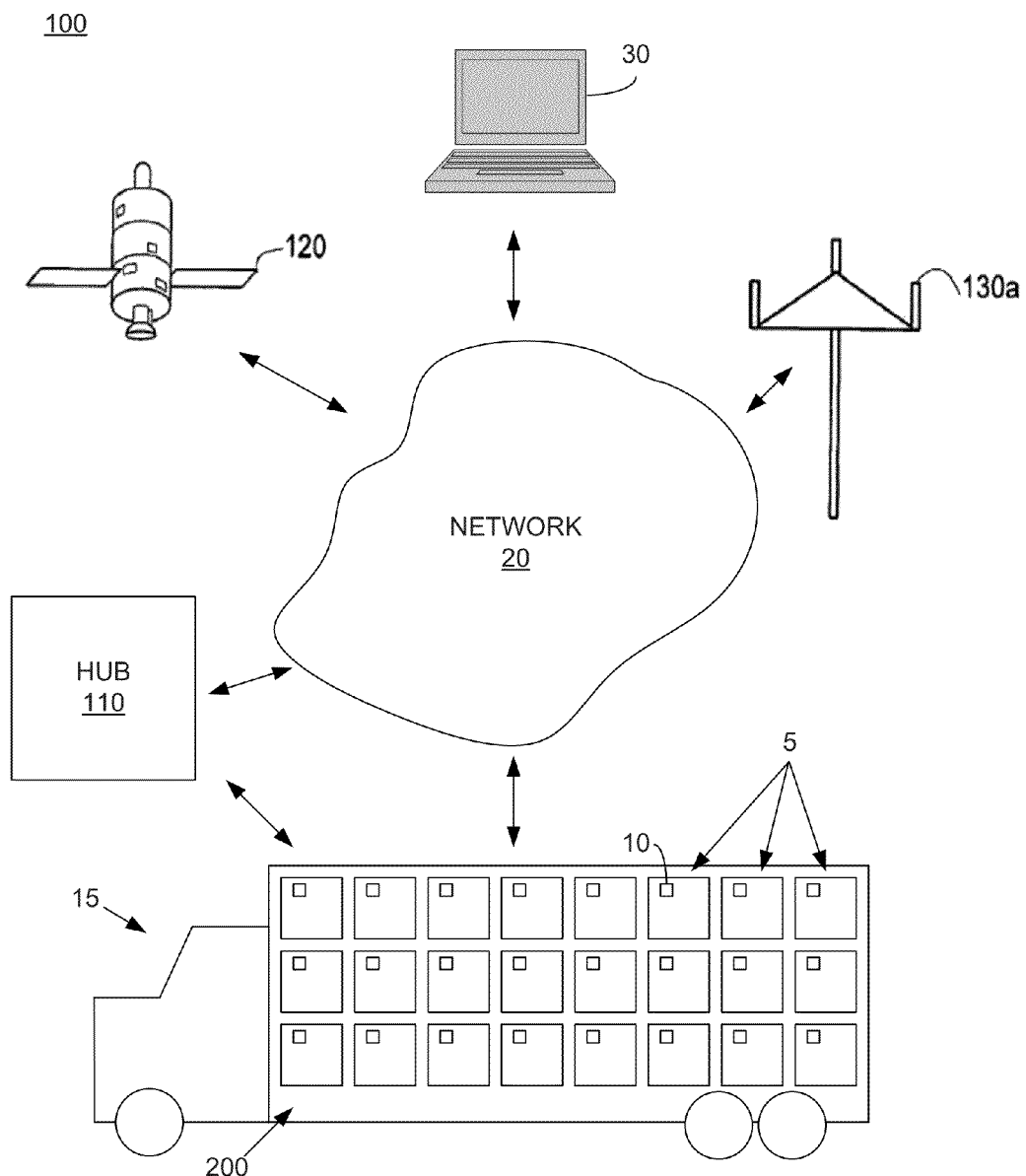
FIG. 1 is an exemplary network environment 100 according to an embodiment of the disclosure.

FIG. 1 is an exemplary network environment 100 including at least one tracking device system 200. The tracking device system 200 may include a plurality of tracking devices 10. Each tracking device 10 may be used to track high-value assets such as (but not limited to) pharmaceuticals, weapons, medical equipment, luxury goods, and/or any other asset or item that can be transported. In various embodiments, the plurality of tracking devices 10 is utilized within wireless proximity of each other to form a network (e.g., 22 in FIGS. 3A-3C, 5, and 6). Each tracking device 10 may be associated with (e.g., placed in or on, be part of, attached to, etc.) a container 5, such as a box, bin, package, or the like. Multiple containers 5 are placed near each other inside a larger enclosure, such as a transportation vehicle 15, cargo bin, or the like. For example, the larger enclosure may be a truck 15 or airplane carrying boxes 5 each containing a tracking device 10 for tracking items in each of the boxes 5. It should be noted that the terms "tracking device" and "container" (e.g., container that contains the tracking device) and equivalents of those terms may be used interchangeably, unless specified otherwise.

In various embodiments, the tracking device 10 is able to transmit and/or receive data and information over a wireless communication interface (e.g., network 20). Coupled with the network 20 are one or more servers exemplified by server 30. In some embodiments, a website may reside on the server 30. The network 20 may represent one or both of local area networks (LAN) and wide area networks (WAN) and/or any other network environment. In particular embodiments, the tracking device 10 may be coupled to the server 30 via the network 20, which may be a wireless WAN (WWAN). In other embodiments, the tracking device 10 may be coupled to a base station, such as hub 110 or router, or other electronic device via a LAN or wireless LAN (WLAN). The base station 110 may be coupled to the server 30 via the WWAN 20 to communicate with the server 30. In yet other embodiments, the tracking device 10 may communicate with the server 30 through a femtocell (which may have its own backhaul), a relay node (e.g., LTE relay node), base station (e.g., Node B, eNode B), and/or the like.

Figure 2:
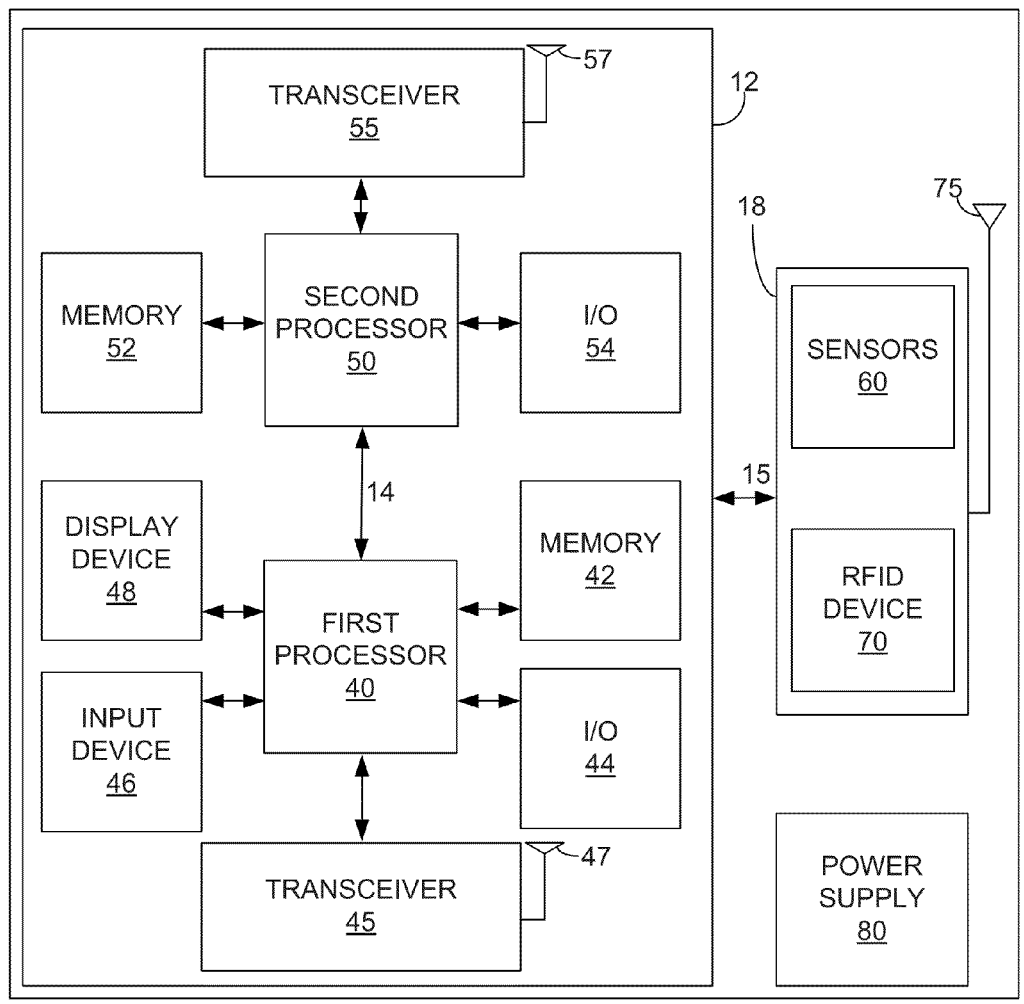
FIG. 2 is a block diagram of a tracking device according to an embodiment of the disclosure.

With reference to FIGS. 1 and 2, the tracking device 100 may be configured to provide voice and/or data communications functionality in accordance with different types of wireless network systems. Examples of wireless network systems may further include (but are not limited to) a wireless local area network (WLAN) system, wireless metropolitan area network (WMAN) system, wireless wide area network (WWAN) system, and the like. Examples of suitable wireless network systems offering data communication services may include (but are not limited to) the Institute of Electrical and Electronics Engineers (IEEE) 802.xx series of protocols, such as the IEEE 802.11 a/b/g/n series of standard protocols and variants (also referred to as "WiFi"), the IEEE 802.16 series of standard protocols and variants (also referred to as "WiMAX"), the IEEE 802.20 series of standard protocols and variants, and the like. It should be noticed that references WAN and WWAN may be made interchangeably throughout the disclosure and/or references to LAN and WLAN may be made interchangeably throughout the disclosure.

The tracking device 10 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including (but not limited to) Bluetooth Specification versions v1.0, v1.1, v1.2, v2.0, v2.0+EDR (Enhanced Data Rate), v2.1+EDR, v3.0+HS (High Speed), v4.0, as well as one or more Bluetooth Profiles, and/or the like.

In various embodiments, the tracking device 10 may comprise a dual-processor architecture 12 including a first processor (host processor) 40 and a second processor 50. The first processor 40 and the second processor 50 may be configured to communicate with each other using interfaces 14 such as (but not limited to) one or more universal serial bus (USB) interfaces, micro-USB interfaces, universal asynchronous receiver-transmitter (UART) interfaces, general purpose input/output (GPIO) interfaces (e.g., inter-integrated circuit (i2C)), control/status lines, control/data lines, shared memory, and/or the like. The tracking device 10 may further include one or more sensors 60 and a radio frequency identification (RFID) device 70.

The first processor 40 may be responsible for executing various software programs such as application programs and system programs to provide computing and processing operations for the tracking device 10. The second processor 50 may be responsible for performing various voice and data communications operations for the tracking device 10 such as transmitting and receiving voice and data information over one or more wireless communications channels. The first processor 40 may be responsible for performing various voice and data communications operations for the tracking device 10 such as transmitting and receiving voice and data information over one or more wireless communications channels.

The first processor 40 and the second processor 50 may perform various communications operations for the tracking device 10 over different types of wireless communications channels. For example, the first processor may be configured to communicate with another device (e.g., another tracking device 10) via a first subsystem (e.g., over WLAN 22 in FIGS. 3A-3D, 5, and 6) and the second processor 50 may be configured to communicate with another device (e.g., the server 30) via a second subsystem (e.g., over the WWAN 20). The first subsystem may be a low-power subsystem relative to the second subsystem that is a high-power subsystem.

Although embodiments of the dual-processor architecture 12 may be described as comprising the first processor 40 and the second processor 50 for purposes of illustration, the dual-processor architecture 12 of the tracking device 10, for example, may comprise additional processors, may be implemented as a dual- or multi-core chip with both the first processor 40 and the second processor 50 on a single chip, etc.

In various embodiments, the first processor 40 may be implemented as a host central processing unit (CPU) using any suitable processor or logic device, such as a general-purpose processor. The first processor 40 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In particular embodiments, the first processor 40 may be a system-on-chip processor (e.g., ARM7-based processor or the like).

The tracking device 10 may include a transceiver module 45 coupled to the first processor 40. In some embodiments, the transceiver module 45 may be integrated with the first processor 40.

The transceiver module 45 may comprise one or more transceivers configured to communicate using different types of protocols, communication ranges, operating power requirements, RF sub-bands, information types (e.g., voice or data), use scenarios, applications, and/or the like. In various embodiments, the transceiver module 45 may comprise one or more transceivers configured to support communication with local devices (e.g., other tracking devices 10) using any number or combination of communication standards. In various embodiments, the transceiver module 45 may comprise one or more transceivers configured to perform data communications in accordance with one or more wireless communications protocols such as (but not limited to) WLAN protocols (e.g., IEEE 802.11 a/b/g/n, IEEE 802.16, IEEE 802.20, etc.), PAN protocols, Low-Rate Wireless PAN protocols (e.g., ZigBee, IEEE 802.15.4-2003), Infrared protocols, Bluetooth protocols, EMI protocols including passive or active RFID protocols, and/or the like.

The transceiver module 45 may be implemented using one or more chips as desired for a given implementation. Although the transceiver module 45 may be shown as being separate from and external to the first processor 40 for purposes of illustration. In various embodiments, some portion or the entire transceiver module 45 may be included on the same integrated circuit as the first processor 40.

In some embodiments, the tracking device 10 may comprise an antenna system 47 for transmitting and/or receiving electrical signals using WLAN protocols or the like. For instance, the antenna system 47 may be coupled to the first processor 40 through the transceiver module 45. The antenna system 47 may comprise or be implemented as one or more internal antennas and/or external antennas.

In particular embodiments, the first processor 40 may be a low-power processing chip configured to support wireless local communication (e.g., mesh networking, ZigBee, 802.15.4, or other suitable communication standard) over a LAN (e.g., 22 in FIGS. 3A-3C, 5, and 6) with other tracking devices 10. The first processor 40 may be configured to process data received from the sensors 60 and/or the RFID device 70. The first processor 40 and the sensors 60 and/or the RFID device 70 may be configured to communicate with each other using interfaces 15 such as (but not limited to) one or more universal serial bus (USB) interfaces, micro-USB interfaces, universal asynchronous receiver-transmitter (UART) interfaces, general purpose input/output (GPIO) interfaces (e.g., inter-integrated circuit (i2C)), control/status lines, control/data lines, shared memory, and/or the like.

The tracking device 10 may comprise a memory 42 coupled to the first processor 40. In various embodiments, the memory 42 may be configured to store one or more software programs to be executed by the first processor 40. The memory 42 may be implemented using any machine-readable or computer-readable media capable of storing data such as (but not limited to) volatile memory or non-volatile memory, removable or nonremovable memory, erasable or non-erasable memory, writeable or re-writeable memory, and/or the like. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 42 may be shown as being separate from the first processor 40 for purposes of illustration, in various embodiments, some portion or the entire memory 42 may be included on the same integrated circuit as the first processor 40. Alternatively, some portion or the entire memory 42 may be disposed on an integrated circuit or other medium (e.g., hard disk drive) external to the integrated circuit of the first processor 40. In various embodiments, the tracking device 10 may comprise an expansion slot (not shown) to support a multimedia and/or memory card, for example.

The tracking device 10 may comprise an input/output (I/O) interface 44 coupled to the first processor 40. The I/O interface 44 may comprise one or more I/O devices such as (but not limited to) a serial connection port, an infrared port, integrated Bluetooth® wireless capability, integrated 802.11x (WiFi) wireless capability, and/or the like to enable wired (e.g., USB cable) and/or wireless connection to a local device, such as another tracking device 10, a local personal computer (PC), and/or the like. In various embodiments, the device 10 may be configured to transfer and/or synchronize information with the local computer system. For example, the local computer system may be used to program the tracking device 10 (e.g., set parameter thresholds for the sensors 60).

The first processor 40 may be coupled to a power supply 80 configured to supply and manage power to the elements of tracking device 10, such as (but not limited to) the first processor 40, the second processor 50, the sensors 60, the RFID device 70, and/or the like. In various embodiments, the power supply 80 may be implemented by a battery to provide direct current (DC) power. In particular embodiments, the power supply 80 may be a rechargeable battery, such as a rechargeable lithium ion battery and/or the like. In other embodiments, the power supply 80 may be implemented by an alternating current (AC) adapter to draw power from a standard AC main power supply.

As mentioned above, the second processor 50 may perform certain voice and/or data communication operations for the tracking device 10. In particular embodiments, the second processor 50 may be a high-power processing chip configured to support WWAN communication. For instance, the second processor 50 may be configured to receive data from the first processor 40 and transmit the data via the WWAN 20, for example, to the server 30 or other remote device.

In various embodiments, the second processor 50 may be configured to communicate voice information and/or data information over one or more assigned frequency bands of a wireless communication channel. In various embodiments, the second processor 50 may be implemented as a communications processor using any suitable processor or logic device, such as a modem processor or base band processor. Although some embodiments may be described with the second processor 50 implemented as a modem processor or base band processor by way of example, it may be appreciated that the embodiments are not limited in this context. For example, the second processor 50 may comprise, or be implemented as, a digital signal processor (DSP), media access control (MAC) processor, or any other type of communications processor in accordance with the described embodiments. In particular embodiments, the second processor 50 may be any of a plurality of modems manufactured by Qualcomm, Inc. or other manufacturers.

In various embodiments, the second processor 50 may perform analog and/or digital base band operations for the tracking device 10. For example, the second processor 50 may perform digital-to-analog conversion (DAC), analog-to-digital conversion (ADC), modulation, demodulation, encoding, decoding, encryption, decryption, and/or the like.

The tracking device 10 may include a transceiver module 55, such as a mobile station modem (MSM) or the like, coupled to the second processor 50. In some embodiments, the transceiver module 55 may be integrated with the second processor 50.

The transceiver module 55 may comprise one or more transceivers configured to communicate using different types of protocols, communication ranges, operating power requirements, RF sub-bands, information types (e.g., voice or data), use scenarios, applications, and/or the like. In various embodiments, the transceiver module 55 may comprise one or more transceivers configured to support communication with devices (e.g., server 30) using any number or combination of communication standards (e.g., GSM, CDMA, TDNM, WCDMA, OFDM, GPRS, EV-DO, WiFi, WiMAX, S02.xx, UWB, LTE, satellite, etc). The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). CDMA2000 covers IS-2000, IS-95, and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2).

In various embodiments, the transceiver module 55 may comprise one or more transceivers configured to perform data communications in accordance with one or more wireless communications protocols such as (but not limited to) WWAN protocols (e.g., GSM/GPRS protocols, CDMA/1× RTT protocols, EDGE protocols, EV-DO protocols, EV-DV protocols, HSDPA protocols, etc.) and/or the like.

The transceiver module 55 may be implemented using one or more chips as desired for a given implementation. Although the transceiver module 55 may be shown as being separate from and external to the second processor 50 for purposes of illustration. In various embodiments, some portion or the entire transceiver module 55 may be included on the same integrated circuit as the second processor 50.

The tracking device 10 may comprise an antenna system 57 for transmitting and/or receiving electrical signals using WWAN protocols or the like. For instance, the antenna system 57 may be coupled to the second processor 50 through the transceiver module 55. The antenna system 57 may comprise or be implemented as one or more internal antennas and/or external antennas. In other embodiments, the tracking device 10 may include a dual-purpose antenna system (not shown) for transmitting and/or receiving electrical signals using WLAN and WWAN protocols, and/or the like. The dual-purpose antenna system may be coupled to one or both of the first processor 40 and the second processor 50 via one or both of the transceiver modules 45, 55.

In various embodiments, the first processor 40 includes the transceiver module 45 for local communication (e.g., WLAN protocols, PAN protocols, etc.) and the second processor 50 includes the transceiver module 55 for longer-range communication (e.g., WWAN protocols). In other embodiments, the tracking device 10 may include a dual-purpose transceiver module configured for local communication and longer-range communication. In such embodiments, for instance, functionality allowing for longer-range communication of the dual-purpose transceiver module may be selectively disabled, for example, as described in the disclosure. In some embodiments, the dual-purpose transceiver module may be coupled to the second processor 50 (e.g., the transceiver module 55). In other embodiments, the dual-purpose transceiver module may be coupled to the first processor 40 (e.g., the transceiver module 45).

In various embodiments, the tracking device 10 may comprise a memory 52 coupled to the second processor 52. The memory 52 may be implemented using one or more types of machine-readable or computer-readable media capable of storing data such as volatile memory or non-volatile memory, removable or non-removable memory, erasable or non-erasable memory, writeable or re-writeable memory, etc. The memory 52 may comprise, for example, flash memory and secure digital (SD) RAM. Although the memory 52 may be shown as being separate from and external to the second processor 52 for purposes of illustration, in various embodiments, some portion or the entire memory 52 may be included on the same integrated circuit as the second processor 50.

In various embodiments, the tracking device 10 may comprise an I/O interface 54 coupled to the second processor 50. The I/O interface 54 may comprise one or more I/O devices to enable wired (e.g., serial, cable, etc.) and/or wireless (e.g., WiFi, short-range, etc.) communication between the tracking device 10 and one or more external computer systems.

In various embodiments, the tracking device 10 (e.g., the second processor 50) is configured to provide location or position determination capabilities. The tracking device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSMI GPRS networks, GPS/OTDOA or AGPS/OTDOA for UMTS networks), and/or the like.

For example, in some embodiments, the tracking device 10 can receive positioning signals from a satellite 120 and can obtain a position location by processing information contained in the satellite positioning signals. The satellite 120 can be part of a satellite-positioning system (SPS), such as GPS, Galileo, GLOSNASS, EGNOS, and the like. Using the known position of satellites 120 and the timing of their respective signals, the tracking device 10 can determine its position location. In other embodiments, the server 30 determines the position location of the tracking device 10. For instance, in some embodiments, the tracking device 10 sends the positioning signals received from the satellite 120 to the server 30. In other embodiments, for instance, the tracking device 10 causes the positioning signals to be sent directly from the satellite 120 to the server 30.

In addition or in the alternative to satellite-based positioning, the tracking device 10 can determine its position location using terrestrial (earth-based) systems or by using a combination of earth-based and satellite-based positioning. For example, in some embodiments, the tracking device 10 communicates with one or more base stations 130a. The base stations 130a, for example, can form range estimates using time of arrival (TOA), angle of arrival (AOA), time difference of arrival (TDOA), and/or related techniques for signals received from the tracking device 10. By combining their known locations with these range estimates, the base stations 130a can determine a position location for the tracking device 10. The base stations 130a can also assist the tracking device 10 by locating satellites 120 or some or all of the performing position location processing using the data obtained by the tracking device 10. In other embodiments, the server 30 determines the position location of the tracking device 10. For instance, in some embodiments, the tracking device 10 sends the positioning signals received from the base station 130a to the server 30. In other embodiments, for instance, the tracking device 10 causes the positioning signals to be sent directly from the base station 130a to the server 30.

In some embodiments, the tracking device 10 includes one or more sensors (e.g., sensors 30) from which the tracking device 10 obtains positioning data. For instance, sensor data such as velocity and acceleration can be used to determine a position offset (a change from a last known position location). The position offset can be combined with a last known position location of the tracking device 10 in order to arrive at an updated position location of the tracking device 10.

In various embodiments, the tracking device 10 supports multiple GPS-based modes, such as (but not limited to), standalone, Mobile System (MS)-Assisted, MS-Based A-GPS, Hybrid A-GPS/AFLT, standalone GPS, gpsOneXTRA Assistance, and/or the like.

In a standalone mode, such as a standalone GPS mode, the tracking device 10 may be configured to determine its position location without receiving wireless navigation data from the network, though the tracking device may receive certain types of position assist data, such as almanac, ephemeris, and coarse data. In a standalone mode, the tracking device 10 may comprise a local location determination circuit 58 (e.g., a GPS receiver), which in some embodiments may be integrated with the second processor 50, configured to receive satellite data (and/or the like) via an antenna (not shown) and to calculate a position location fix. The local location determination circuit 58 may alternatively comprise a GPS receiver (or the like) in housing separate from a housing of the tracking device 10, but in the vicinity of the tracking device 10 and configured to communicate with the tracking device 10 (e.g., via a PAN, such as Bluetooth, and/or the like). When operating in an MS-assisted mode or an MS-based mode, the tracking device 10 may be configured to communicate over a radio access network (e.g., UMTS radio access network) with a remote computer (e.g., a location determination entity (PDE), a location proxy server (LPS), a mobile positioning center (MPC), and/or the like).

In an MS-assisted mode, such as an MS-assisted AGPS mode, the remote computer may be configured to determine the position location of the tracking device and provide wireless data comprising a position fix. In an MS-based mode, such as an MS-based AGPS mode, the tracking device 10 may be configured to determine its position location using acquisition data or other wireless data from the remote computer. The acquisition data may be provided periodically. In various embodiments, the tracking device 10 and the remote computer may be configured to communicate according to a suitable MS-PDE protocol (e.g., MS-LPS protocol, MS-MPC protocol, and/or the like) such as (but not limited to) the TIA/EIA standard IS-801 message protocol for MS-assisted and MS-based sessions in a CDMA radiotelephone system.

When assisting the tracking device 10, the remote computer may handle various processing operations and may provide information to aid position location determination. Examples of position assist data may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, coarse data, and/or the like.

In various embodiments, the position assist data provided by the remote computer may improve the speed of satellite acquisition and the probability of a position location fix by concentrating the search for a GPS signal and/or may improve the accuracy of position location determination. Each position fix or series of position fixes may be available at the tracking device 10 and/or at the remote computer depending on the position location determination mode. In some cases, data calls may be made and position assist data may be sent to the tracking device 10 from the remote computer for every position fix (e.g., in an ad hoc mode). In other cases, data calls may be made and position assist data may be sent periodically and/or as needed.

In various embodiments, the tracking device 10 may comprise dedicated hardware circuits or structures, or a combination of dedicated hardware and associated software, to support position location determination. For example, the transceiver module 55 and the antenna system 57 may comprise a GPS receiver or transceiver hardware and one or more associated antennas coupled to the second processor 50 to support position location determination. Although the local location determination circuit 58 may be shown as having some or an entire portion included on the same integrated circuit as the second processor 50 for purposes of illustration, in various embodiments, the local location determination circuit 58 may be separate from the second processor 50.

In various embodiments, the second processor 50 may be configured to invoke a position location fix by configuring a position location engine and requesting a position location fix. For example, a position location engine interface (not shown) on the second processor 50 may set configuration parameters that control the position location determination process. Examples of configuration parameters may include, without limitation, position location determination mode (e.g., standalone, MS-assisted, MS-based), actual or estimated number of position location fixes (e.g., single position location fix, series of position location fixes, request position assist data without a position location fix), time interval between position location fixes, Quality of Service (QoS) values, optimization parameters (e.g., optimized for speed, accuracy, or payload), PDE address (e.g., IP address and port number of LPS or MPC), and/or the like.

In some embodiments, the second processor 50 also may set request/response parameters to request and return various types of position location information. Examples of request/response parameters may include current position location, latitude, longitude, altitude, heading, vector information such as horizontal and vertical velocity, sector-based position location, position location fix method, level of accuracy, time offset, position uncertainty, device orientation, client initialization and registration, and/or the like.

The second processor 50 may comprise or implement a position location engine such as a GPS engine (e.g., 134). In various embodiments, the position location engine may be configured to provide position location determination capabilities for the tracking device 10. In some embodiments, the position location engine may be implemented as software operating in conjunction with hardware (e.g., GPS receiver hardware) allowing the tracking device 10 to receive and process GPS satellites signals (or the like) for position location determination. In one embodiment, the position location engine may be implemented as a QUALCOMM® gpsOne® engine.

In various embodiments, the position location engine may employ one or more position location determination techniques such as (but not limited to) GPS, CGI, CGI+TA, EFLT, TDOA, AOA, AFTL, OTDOA, EOTD, AGPS, GPS/AGPS, hybrid techniques, and/or the like. The position location engine also may be configured to operate in one or more position location determination modes including a standalone mode, an MS-assisted mode, and an MS-based mode. The determined position location information generated and/or obtained by the position location engine generally may comprise any type of information associated with the position location of the tracking device 10. Examples of position location information may include, without limitation, current position location, latitude, longitude, altitude, heading information, vector information such as horizontal and vertical velocity, sector-based position location, position location fix information, position location uncertainty, device orientation, and/or the like.

In particular embodiments, the second processor 50 is configured to determine the position location of the tracking device 10. In other embodiments, a sensor, such as one of the sensors 30, is configured to determine the position location of the tracking device 10. In various embodiments, the position location functionality of the tracking device 10 may be selectively disabled or reduced. For example, the position location functionality of the client tracking devices may be disabled, while the position location functionality of the master tracking devices may be enabled.

In various embodiments, the tracking device 10 may comprise a user input device 46 coupled to the first processor 40. The user input device 46 may comprise, for example, a QWERTY key layout and/or an integrated number dial pad. The tracking device 100 may comprise various keys, buttons, and switches such as, for example, input keys, preset and programmable hot keys, left and right action buttons, a navigation button such as a multidirectional navigation buttons, phone/send and power/end buttons, preset and programmable shortcut buttons, a keypad, an alphanumeric keypad, and/or the like.

In various embodiments, the first processor 40 may be coupled to a display 48. The display 48 may comprise any suitable visual interface for displaying content to a user of device 100, such as an LCD, LED, OLED, and/or the like. For example, the display 48 may be implemented by an LCD such as a touch-sensitive color (e.g., 16-bit color) thin-film transistor (TFT) LCD screen.

The RFID device 70 may include an RFID reader for remotely retrieving data from RFID tags or transponders. An RFID tag can be attached to or incorporated into a corresponding asset (e.g., pharmaceutical container) or group of assets (e.g., multiple pharmaceutical containers within a box) for purpose of identification using radio waves. RFID tags contain at least two parts, an integrated circuit for storing and processing information, modulating and demodulating a radio frequency ("RF") signal, and perhaps other specialized functions; and an antenna for receiving from and/or transmitting the RF signal. The RFID device 70 may employ an antenna 75, such as (but not limited to) a near field communication (NFC), proximity, or boundary antenna, to communicate with the RFID tag(s). Data (e.g., values, parameters, etc.) retrieved from the RFID tag(s) is transmitted to the first processor 40.

Figure 4:
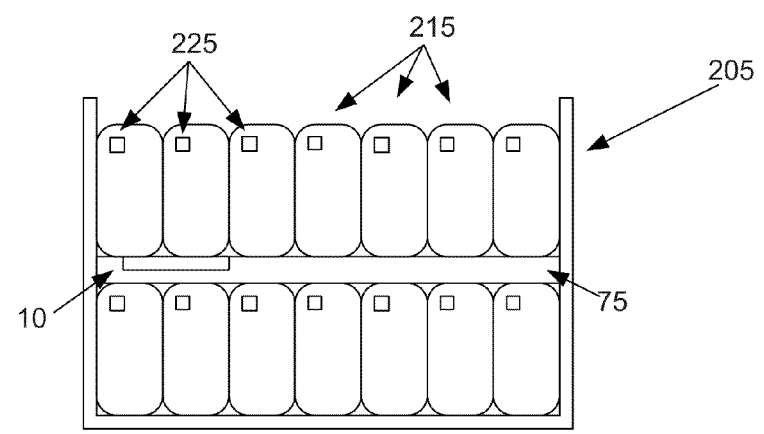
FIG. 4 is a view of container containing a tracking device and items to be tracked by the tracking device according to an embodiment of the disclosure.

With reference to FIGS. 2 and 4, in some embodiments, the antenna 75 of the RFID device 70 may be sized and shaped to fit within a box 205 or other container for containing assets. For example, the antenna 75 may be a flat integrated loop antenna shaped to fit within the box 205. Merchandise (assets) 215, each (or at least some) having an RFID tag 225, is placed in the box 205 to partially fill the box 205. The flat parasitic antenna 75 is above the merchandise 215. The tracking device 10 (or the daughter card 18) may be inserted in a pocket of the antenna structure 75. Then the remaining merchandise 215 may be placed above the antenna 75 to fill the box 205. In other embodiments, the antenna 75 may be integrated into the box 205. For example, the antenna 205 may be a sidewall (or portion thereof) of the box 205. In various embodiments, the antenna 75 may be made of any suitable material such cardboard, plastic, or the like and include metal strips, wire, or other suitable conductive material.

With reference to FIGS. 1-2, the sensors 30 are configured to measure or detect one or more conditions or parameters relating to the tracked assets. The one or more conditions or parameters may include (but not limited to) light, humidity, temperature, motion, shock, pressure, airflow, vibration, gas level, magnet fields, and/or the like. Detection of shock or vibration, for instance above a predetermined threshold, by the sensors 30 may indicate, for example, that the container in which the tracked assets are contained is being opened. Likewise, detection of light, for instance above a predetermined threshold, by the sensors 30 may indicate, for example, that the container is open. Detection of motion, for instance above a predetermined threshold, by the sensors 30 may indicate, for example, that the container is being moved (e.g., stolen). Detection of humidity or temperature, for instance above a predetermined threshold, by the sensors 30 may indicate, for example, that the contents of the container may be harmed (e.g., spoil, freeze, etc.) by the current environmental conditions. The measured or detected data may be transmitted to the first processor 40.

In particular embodiments, the sensors 60 and the RFID device 70 may be arranged on a daughter card 18 for communicating with the first processor 40. In some embodiments, the daughter card 18 may be separate from the first processor 40 and the second processor 50.

The second processor 50 may communicate with the first processor 40 to retrieve sensor data and the RFID data received from the sensors 60 and the RFID data, respectively. In some embodiments, the second processor 50 (and/or the first processor 40) may be configured to allow for setting of thresholds for the sensors 60 (and/or the RFID device 70). In particular embodiments, the second processor 50 may receive an interrupt from the first processor 40 when a threshold for the sensors 60 is passed. For example, a motion threshold may be set (e.g., via the server 30) such that any motion detected above the set threshold causes an interrupt to be sent from the first processor 40 to the second processor 50. As a result, the second processor 50, for example, may wake from a hibernation mode to transmit data relating to the detected motion, the asset being tracked, and/or the like.

In various embodiments, one or more of the tracking devices 10 can serve as a master for other tracking devices (clients). The master tracking devices can power up and power down the higher-power second processor 50 and maintain the lower-power first processor 40. The client tracking devices could merely maintain the lower-power first processor 40 active for local networking (e.g., mesh networking) and data exchanges with the master tracking device and other client tracking devices, for example via the LAN 22 (e.g., 3A-3C, 5, and 6). Thus, because the master tracking devices may report data on behalf of the client tracking devices, the client tracking devices may hibernate their respective second processors 50 or otherwise disable or reduce their respective WWAN communication functionality (and/or other functionality) (e.g., client tracking devices 10B and 10D in FIG. 5).

Figure 3A:
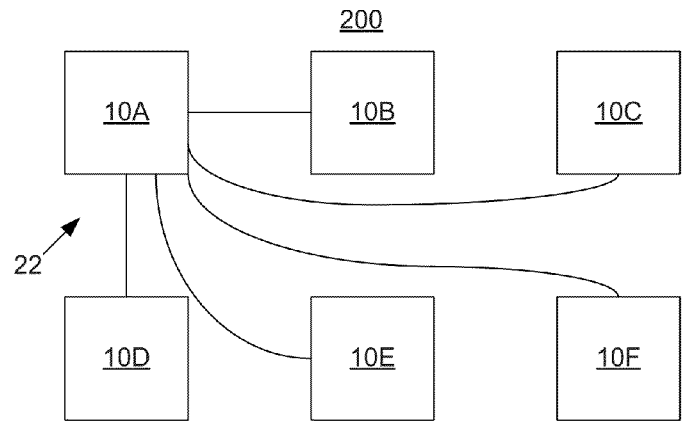
FIG. 3A is block diagram of a tracking device network according to an embodiment of the disclosure.

For instance, as shown in FIG. 3A, tracking device 10A is serving as a master for client (member) tracking devices 10B, 10C, 10D, 10E, and 10F. Each of the client tracking devices 10B, 10C, 10D, 10E, 10F disables WWAN communication (e.g., disables the second processor 50 in FIG. 2) and continues tracking, via the sensors (60 in FIG. 2) and the RFID device (70 in FIG. 2), its corresponding asset(s). The client tracking devices 10B, 10C, 10D, 10E, 10F receives the sensor data and RFID data (e.g., via the respective first processor 40) and transmit the data to the master tracking device 10A via a LAN 22. The master tracking device 10A may also track a corresponding asset in a similar manner as the client tracking devices 10B, 10C, 10D, 10E, 10F. The master tracking device 10A (e.g., via the second processor 50) may transmit its sensor data and RFID data along with the data received from the client tracking devices 10B, 10C, 10D, 10E, 10F via the WWAN 20 (FIG. 1) to the server 30 or other remote device.

Figure 3B:
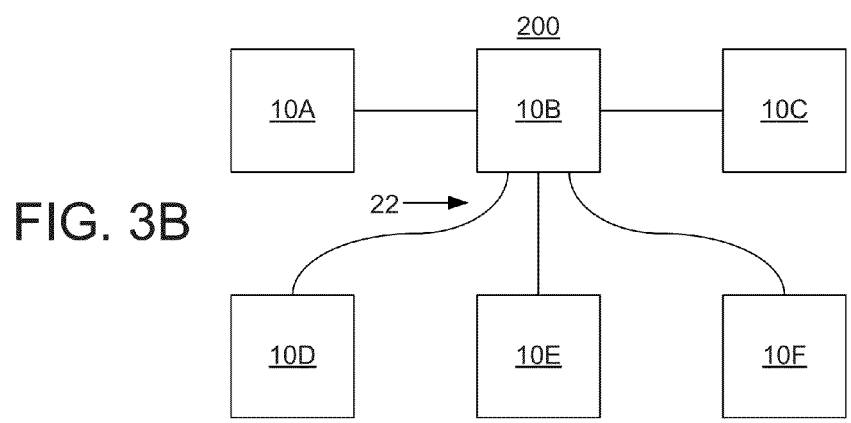
FIG. 3B is a block diagram of a tracking device network according to an embodiment of the disclosure.
Figure 3C:
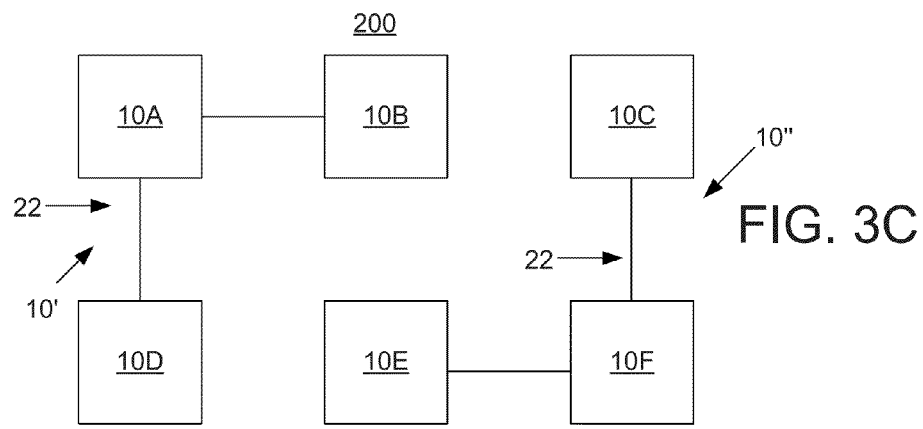
FIG. 3C is a block diagram of a tracking device network according to an embodiment of the disclosure.
Figure 3D:
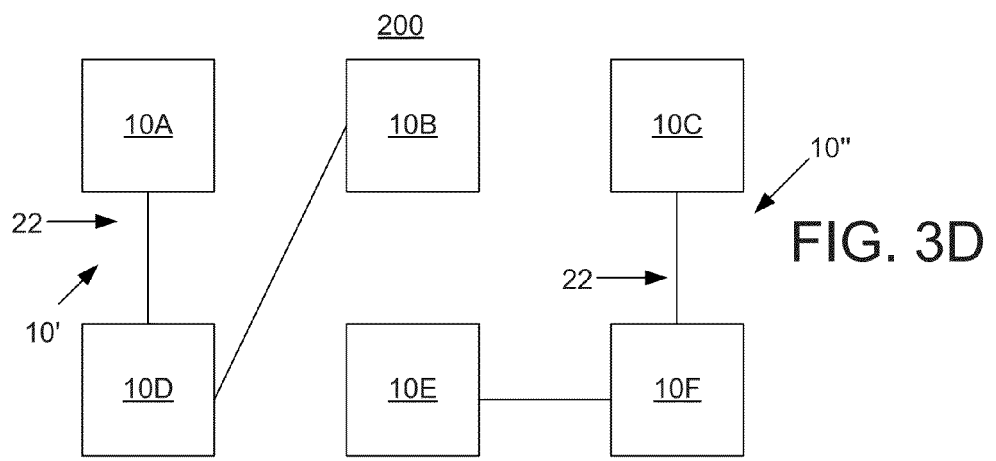
FIG. 3D is a block diagram of a tracking device network according to an embodiment of the disclosure.

In various embodiments, local network connectivity (e.g., via LAN 22) among the client tracking devices could include single-hop networking—one or more client tracking devices are connected to a master tracking device (e.g., client tracking devices 10C and 10E connected to a master tracking device 10F in FIG. 3D)—and/or multi-hop networking—one or more client tracking devices are connected to a master tracking device through at least one other client tracking device (e.g., client tracking device 10B is connected to master tracking device 10A through client tracking device 10D)—using ZigBee, 802.15.4, or other suitable communication standard.

Different tracking devices 10 may have different available battery life and wireless link quality for WWAN connectivity (e.g., via the WWAN 20). For instance, depending on the location of the tracking devices 10 (or containers containing the tracking devices) in the transport vehicle 15, some tracking devices 10 may have better WWAN link quality than other tracking devices 10. Higher quality WWAN links can consume less energy to transmit the same amount of data than lower quality WWAN links. For example, tracking devices 10 in containers on an outer periphery of a truck may have better WWAN link quality than those closer to the interior of the truck. Thus, by selecting tracking devices 10, for example that are located on the outer periphery of the truck, for WWAN connectivity, energy collectively consumed by the tracking devices 10 can be conserved.

Accordingly, in various embodiments, the tracking devices 10 are configured to maximize system life (e.g., collective battery charge) by selecting one or more appropriate nodes (master tracking devices) from among the tracking devices for WWAN communication. The master tracking devices may be selected based on WWAN link quality (Qi), remaining battery life (Ei), and/or other suitable factors.

In various embodiments, the tracking device serving as the master tracking device may change. For instance, as shown in FIGS. 3A and 3B, the tracking device serving as master changes from tracking device 10A (FIG. 3A) to tracking device 10B (FIG. 3B). As such, the new master tracking device 10B serves as master for the current client tracking devices 10A, 10C, 10D, 10E, 10F. The client tracking devices (e.g., 10C, 10D, 10E, 10F) that were previously client tracking devices may continue to operate in a similar manner. The client tracking device 10A, which was previously the master tracking device, may disable WWAN communication. The new master tracking device 10B, which was previously a client device, may enable WWAN communication to allow communication via the WWAN 20. As such, for example, the new master tracking device 10B (e.g., via the second processor 50) may transmit its sensor data and RFID data along with the data received from the client tracking devices 10A, 10C, 10D, 10E, 10F via the WWAN 20 (FIG. 1) to the server 30 or other remote device.

With reference to FIGS. 1-3B, in some embodiments, the tracking device serving as the master tracking device (or other role) may change over time or periodically. In particular embodiments, the tracking device serving as the master tracking device may change based on WWAN link quality (Qi), remaining battery life (Ei), duration serving as a master tracking device, and/or other suitable factors, non-limiting examples of which are provided throughout the disclosure. For example, if the battery life of the master tracking device (e.g., 10A) falls below a threshold, the tracking device with the next best WWAN link quality (e.g., 10B) may become the new master tracking device. As another example, if the WWAN link quality of a client tracking device (e.g., 10C) exceeds the WWAN link quality of the master tracking device (e.g., 10A), that tracking device may become the new master tracking device.

In various embodiments, using a tracking device 10 with a better link reduces energy for communications E_comm overall in the tracking device system 200. For the higher-power second processor 50 in each tracking device 10, energy is consumed for ramping up power to the second processor 50 (E_pwrup), ramping down the power to the second processor 50 (E_pwrdown), and for communications (E_comm) as well. Because only one of the tracking devices powers up or down (i.e., is designated at the master tracking device), the cost (transition cost) of powering up or down is incurred only once for all the other tracking devices supported by the master tracking device.

Let B_i be the available battery energy in tracking device i (e.g., master tracking device), and let $Q_i$ be the energy consumed per bit for communication by tracking device i, based on its link quality. If X bits are communicated by a tracking device i, this consumes energy given by equation (1). This results in a corresponding reduction in the available battery energy for the tracking device i.

$$E_i = E\_pwrup + Q_i * X + E\_pwrdown \quad (1)$$

If each tracking device k (e.g., client tracking device) needs to communicate $L_k$ bits, where the tracking devices use the i-th tracking device for WWAN communications (i.e., designated as the master tracking device), then the number of bits communicated is given by equation (2)

$$X = \Sigma k L_k \quad (2)$$

If each tracking device k independently communicates with the WWAN 20 using its corresponding energy per bit $Q_k$, then the total energy consumed is given by equation (3).

$$E = \Sigma k (E\_pwrup + Q_k * L_k + E\_pwrdown) \quad (3)$$

The energy saved by using tracking device i is given by equation (4).

$$\Delta E = (k-1)(E\_pwrup + E\_pwrdown) + \Sigma k (Q_k - Q_i) * L_k \quad (4)$$

Accounting for the cost for local data transfers of $L_k$ bits from each node k to node i and assuming an average cost of S energy units (joules) per bit for local data transmitted by nodes, then the actual energy saved is given by equation (5).

$$\Delta E = (k-1)(E\_pwrup + E\_pwrdown) + \Sigma k (Q_k - Q_i - S) * L_k \quad (5)$$

In various embodiments, the tracking device system 200 may implement more than one master tracking device 10. For instance, given the distributed nature of the tracking devices 10, many tracking devices could serve as master tracking devices with good link qualities, so that the processing load in the tracking device system 200 can be distributed between the multiple master tracking devices. In addition, the processing load can be replicated across multiple master tracking devices to introduce fault tolerance and theft protection in the tracking device system 200, and to eliminate the possibility of a single-point-of-failure in the tracking device system 200. As time progresses, the master tracking devices may be replaced by other master tracking devices, for example, which may have higher battery life albeit lower quality links that consume higher energy for communication.

Figure 5:
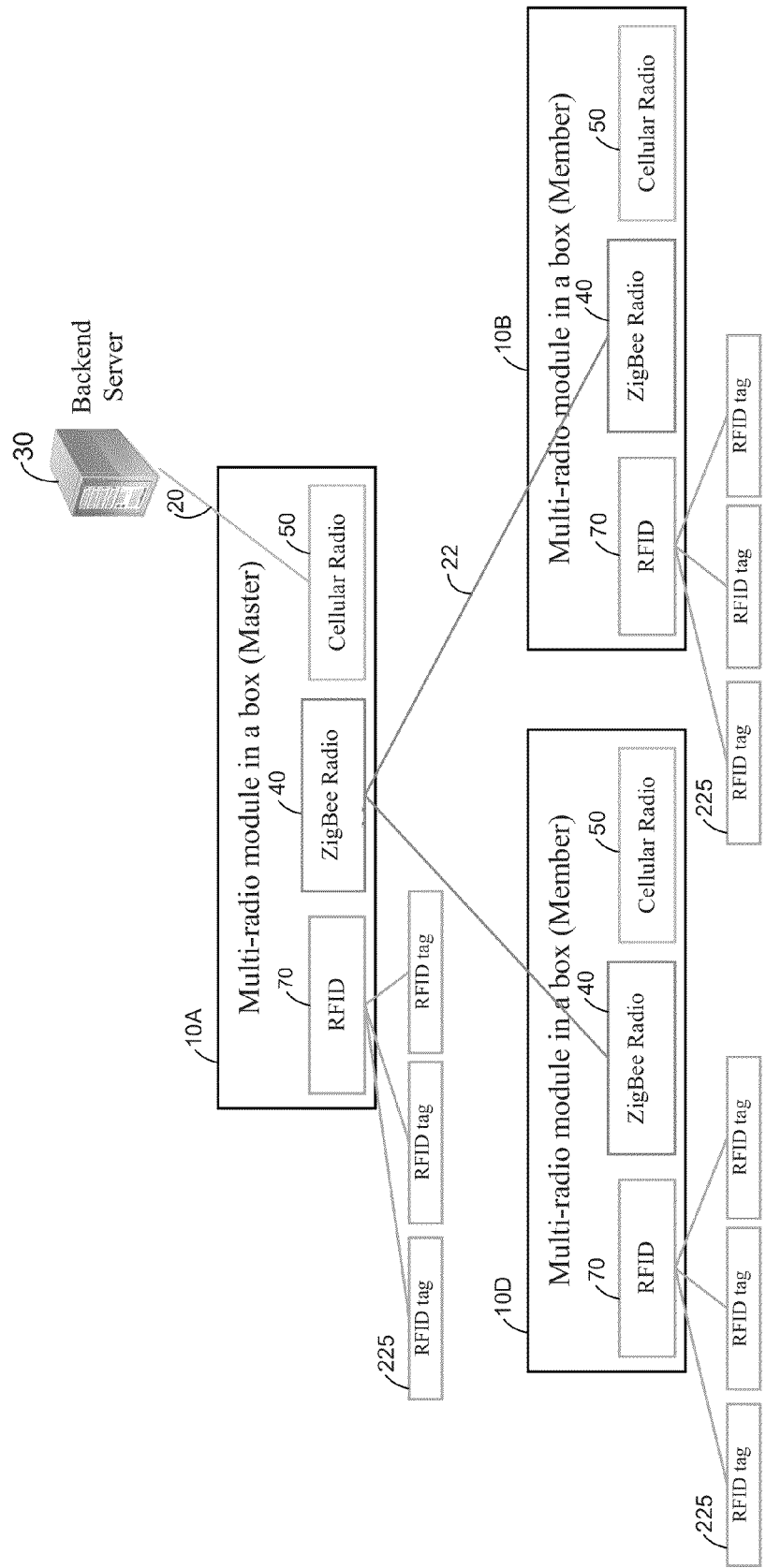
FIG. 5 is a block diagram of a tracking device network according to an embodiment of the disclosure.

For instance, with reference to FIGS. 3C and 5, the tracking device 10A may serve as a first master tracking device for client tracking devices 10B, 10D. The tracking devices 10A, 10B, and 10D may form a first cluster 10'. The tracking device 10F may serve as a second master tracking device for client tracking devices 10C, 10E. The tracking devices 10F, 10C, 10E may form a second cluster 10''. The first master tracking device 10A (e.g., via the second processor 50) may transmit its sensor data and RFID data along with the data received from the client tracking devices 10B, 10D via the WWAN 20 (FIG. 1) to the server 30 or other remote device. Likewise, the second master tracking device 10F (e.g., via the second processor 50) may transmit its sensor data and RFID data along with the data received from the client tracking devices 10C, 10E via the WWAN 20 to the server 30 or other remote device.

If the $L_k$ bits associated with tracking device k is sent by two master tracking devices i and j to enable fault tolerance and theft detection of a tracking device, then the energy saved is given by formula (6).

$$\Delta E = (k-2)(E\_pwrup + E\_pwrdown) + \Sigma k(Q_k - Q_i - Q_j - S) * L_k \quad (6)$$

In particular embodiments, the cost of local data transferred is kept unchanged with the presumption that multiple receivers can receive the same data from a transmitter, and with the assumption that energy cost of reception is negligible compared to the cost for transmissions.

In various embodiments in which two or more master tracking devices are used for redundant information transfer, one or more of the master tracking devices may send different data from the other master tracking device(s). For instance, in some embodiments, one master tracking device i (e.g., 10A in FIG. 3C) may transmit all the information (e.g., first data) and a second master tracking device j (e.g., 10F in FIG. 3C) may only send partial information (e.g., second data). In some embodiments, the partial information is data that is sent less frequency than the first data. In some embodiments, the partial information is data that is a compressed form of the first data. In some embodiments, the partial information is data that indicates presence of the tracking device.

Such embodiments, for instance, result in a compression factor of δ in the tracking device system 200, so that the energy saved in a tracking device system having two master tracking devices and with compressed transmission by a second master (of the two master tracking devices) is given by equation (7).

$$\Delta E = (k-2)(E\_pwrup + E\_pwrdown) + \Sigma k(Q_k - Q_i - \delta Q_j - S) * L_k \quad (7)$$

In some embodiments in which two or more master tracking devices are used, one master tracking device (e.g., 10A in FIG. 3C) could be configured to send complete information about a first set of client tracking devices (e.g., 10B, 10D in FIG. 3C) and redundant info about a second set of client tracking devices (e.g., 10C, 10E in FIG. 3C). The other master tracking device (e.g., 10F in FIG. 3C) may be configured to send complete information about the second set of client tracking devices (e.g., 10C, 10E in FIG. 3C) and redundant information about the first set of client tracking devices (e.g., 10B, 10D in FIG. 3C). If the energy per bit consumed for transmission by each master tracking device is approx Q, then along with the compressed redundancy factor δ in the tracking device system 200, the overall energy saved is given by formula (8).

$$\Delta E = (k-2)(E\_pwrup + E\_pwrdown) + \Sigma k(Q_k - (1+\delta)Q - S) * L_k \quad (8)$$

Figure 6:
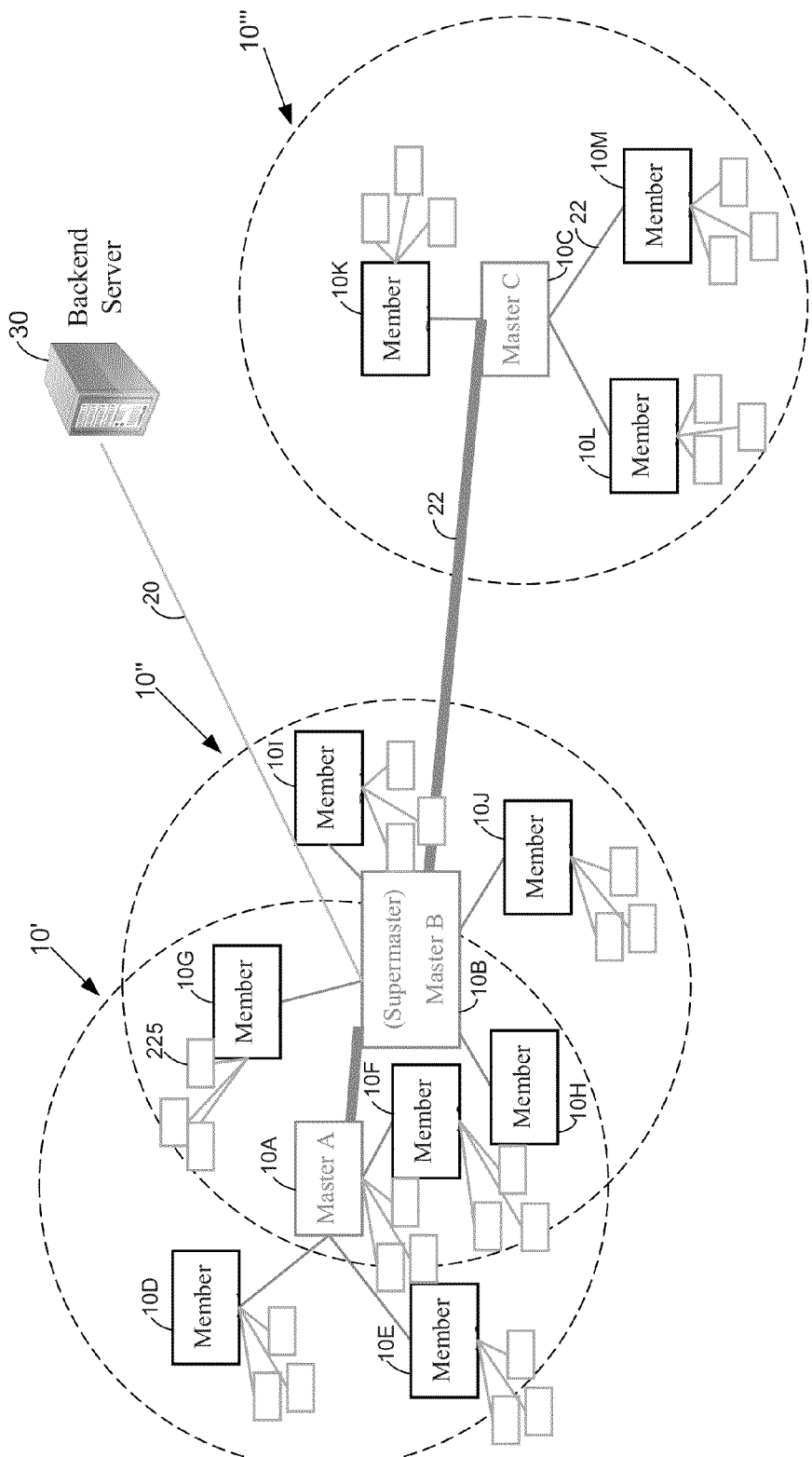
FIG. 6 is a block diagram of a tracking device network according to an embodiment of the disclosure.

With reference to FIG. 6, in various embodiments, the tracking device system 200 may implement at least a three-level hierarchy of tracking devices. In some embodiments, the hierarchy may include client (member) tracking devices, master tracking devices, and super-master tracking devices. In other embodiments, the hierarchy may include any number of levels.

In particular embodiments, when a new tracking device 10D first joins the network, the new tracking device 10D may join a cluster 10' of tracking devices 10A, 10E, 10F in the new tracking device's 10D neighborhood as a client tracking device. After joining the cluster 10', the new tracking device 10D reports its sensor data and control information to the master tracking device 10A of the cluster 10', for instance, periodically or on-demand. The roles of each tracking device within the cluster 10' may change, for example, in a manner described in the disclosure.

In particular embodiments, when a new tracking device 10C joins the network, the new tracking device 10C may choose to start a new cluster 10''' with itself as the master tracking device. This new cluster 10''', which includes tracking devices 10C, 10K, 10L, 10M, does not interfere with existing clusters. The master tracking device 10C may broadcast beacons, accepts new client tracking devices, and collect sensor and control information from all the client tracking devices (e.g., 10K, 10L, 10M) in its cluster 10'''. The master tracking device 10C may communicate with other master tracking devices 10B, 10A to exchange data and control information. The master tracking device 10C may choose to quit being a master tracking device (at which point a client tracking device may become the master tracking device) based on various factors, such as (but not limited to) remaining battery level, time duration it has been a master, and/or the like.

A particular tracking device may choose to become a master tracking device based on various factors, such as (but not limited to), the current number of master tracking devices in the tracking device system 200, whether there are any master tracking devices nearby the particular tracking device, time duration that another master tracking device has been a master tracking device, battery life of the particular tracking device (and/or other client tracking devices and/or other master tracking devices), the number of client tracking devices that need to need to be covered by the particular tracking device, link quality of the particular tracking device with other tracking devices (e.g., other client tracking devices and/or other master tracking devices), WWAN link quality, transition costs (e.g., cost of powering up and/or powering down WWAN communication and/or tracking device components, such as the first processor 40, the second processor 50, etc.), system constraints, and/or the like, and/or other factors provided in the disclosure. Some system constraints may include (but are not limited to), the number of client tracking devices allowed in a cluster, the number of master tracking devices allowed in the tracking device system 200, and/or the like. In some embodiments, the system constraints may be provided remotely, for instance, from the server 30 or through the WWAN 20 (e.g., in a system information block). In various embodiments, the particular tracking device may use one or more formulas, such as (but not limited to) formulas (1)-(8), and/or the like to determine whether to become a master tracking device.

In particular embodiments, a master tracking device may serve as a super-master tracking device 10B. The super-master tracking device 10B may use a WWAN backhaul (e.g., WWAN 20) to communicate with the server 30. For example, the super-master tracking device 10B may have its long-distance radio (e.g., the second processor 50 or related component) turned on in order to transmit all collected data from the client tracking devices (e.g., 10G, 10H, 10I, 10J) in its cluster 10'' and other masters 10A, 10C to the server 30.

The other master tracking devices 10A, 10C may form an indirect path to the server 30 via the super-master tracking device 10B and/or an intermediary master tracking device (not shown), which communicates with the super-master tracking device 10B and/or a further intermediary master tracking device. In such embodiments, for example, the master tracking devices 10A, 10C do not have their long-distance radio (or the like) or otherwise provide for direct communication with the server 30. Thus, in various embodiments, a master tracking device is in effect a super-master tracking device for the client tracking devices in its cluster because the master tracking device provides a backhaul, albeit indirectly through another node, to the server 30. The master tracking device may just choose to not provide a direct backhaul to the server 30.

Whether a particular master tracking device will become a super-master tracking device (or vice-versa) may depend on various factors, such as, but not limited to, link quality of the long-distance wireless link, the remaining battery level of the particular master tracking device (and/or other master tracking devices and/or a current super-master tracking device), the data load from the tracking devices in the cluster of the particular master tracking device, the data load from other neighboring master tracking devices (and their corresponding client tracking devices), and/or the like, and/or other factors provided in the disclosure. In various embodiments, the particular master tracking device may use one or more formulas, such as (but not limited to) formulas (1)-(8), and/or the like to determine whether to become a super-master tracking device.

In some embodiments, one exemplary factor of whether a particular master tracking device will become a super-master tracking device (or vice-versa) may depend on energy efficiency of alternate routes. For example, the particular master tracking device may become a super-master tracking device if using a direct WWAN connection (e.g., between the particular master tracking device and the server 30) would provide a greater energy savings than an indirect path in which the particular master tracking device uses at least one other master tracking device to communicate with a an alternative super-master tracking device, which is using a direct WWAN connection with the server 30.

In some embodiments, one exemplary factor of whether a particular master tracking device will become a super-master tracking device (or vice-versa) may depend on one or more network constraints, such as a load (e.g., data volume, duty cycle, number of concurrent WWAN links, and/or the like) on the WWAN 20, WWAN availability, WWAN channel bandwidth, WWAN code availability, WWAN time utilization, and/or the like. For example, the particular master tracking device would not become a super-master tracking device if the increased load of adding the particular master tracking device to the WWAN 20 (as a super-master tracking device) would overburden the WWAN 20 given the current load of the WWAN 20 (e.g., from other tracking devices, devices that are not tracking devices, users, and/or the like). Other network constraints may include (but are not limited to) the number of super-master tracking devices allowed in the tracking device system 200, the coexistence among multiple tracking device systems (e.g., coexistence between a tracking device system implemented by a first entity or company, a tracking device system implemented by a second entity, and a tracking device system implemented by a third entity), and/or the like.

In some embodiments, one exemplary factor of whether a particular master tracking device will become a super-master tracking device (or vice-versa) may depend on a load (e.g., data volume, duty cycle, number of concurrent WWAN links, and/or the like) on the LAN 22, for instance, from the master tracking device's member tracking devices and/or from other master tracking devices.

In various embodiments, some tracking devices could communicate using different WWAN protocols than WWAN protocols used by other tracking devices. Accordingly, WWAN link conditions for some tracking devices may be different from WWAN link conditions of other tracking devices. For example, at a given time, a tracking device using an LTE-based WWAN backhaul could have a better WWAN link than a WWAN link of a tracking device using a HSPA-based WWAN backhaul. Based on, for example (but not limited to), battery level (energy remaining), battery life, WWAN link quality, type of WWAN protocol, and/or other factors, a particular master tracking device may determine whether to become a super-master tracking device (or vice-versa). For instance, a ratio of the battery level to power associated with communicating via a particular WWAN protocol would reflect the battery life when using the particular WWAN protocol. In particular embodiments, the track devices are multi-mode capable with the ability to use different WWAN protocols (and/or different frequencies) to allow a particular tracking device to select the most power-efficient and/or performance-efficient WWAN protocol (and/or frequency) to use at a particular time and/or location as the vehicle containing the tracking devices moves.

With reference to FIGS. 1-6, in particular embodiments, each of the tracking devices 10 maintains a neighbor list of other tracking devices (e.g., other tracking devices in its cluster). In some embodiments, each of the client tracking devices may transmit its neighbor list to the master tracking device. In further embodiments, the master tracking device may transmit its neighbor list and/or the neighbor lists received from the client tracking devices to the super-master tracking device. The super-master tracking device may transmit its neighbor lists and/or the neighbor lists received from the master tracking devices directly to the server 30. In some embodiments, the full neighbor list may be reported periodically by the super-master tracking device with a low frequency of transmission. Changes to the neighbor list (as received from other tracking devices) may be reported by the super-master tracking device more frequently, for example. This may provide an approximate location of each tracking device relative to other tracking devices. In particular, this may indicate the presence (or absence) of a tracking device. The absence of a tracking device may indicate a problem, such as low battery level or the tracking device is otherwise inoperable, or that the tracking device has been removed without authorization (e.g., the tracking device and/or the assets associated with the tracking device has been stolen).

In various embodiments, a tracking device 10 could broadcast its preference to not be a master tracking device (and/or super-master tracking device), which can trigger the election of a suitable alternate master tracking device from among available tracking devices that are candidates for being master tracking devices based on various factors, such as (but not limited to) the relative battery availability, expected energy per bit consumed over the WWAN 20, and/or the like, and/or the factors provided in the disclosure.

In various embodiments, tracking devices (or boxes containing the tracking devices) may be physically moved to the periphery of the transport vehicle (e.g., truck) to allow tracking devices that did not serve as master tracking devices to now become master tracking devices with a better wireless link or channel. In other embodiments, tracking devices located away from the periphery can take over the role of master tracking devices, for example once battery levels of the tracking devices on the periphery have been sufficiently depleted, thus incurring a higher cost of communication than the other tracking devices. The role of master tracking devices would proceed inwards to the other tracking devices as time progresses.

In various embodiments, each of the tracking devices can have an indicator (e.g., display 48) for displaying data, such as (but not limited to) available energy (e.g., battery charge), wireless link quality, current role of the tracking device (e.g., client, master, or super-master), time serving in current role, network load, and/or the like, and/or data relating to any one or more of the factors used to determine whether a tracking device changes its role. Accordingly, for example, on a subsequent trip, tracking devices with higher energy (as displayed on the indicator) can be placed on the periphery to obtain better WWAN link connectivity and potentially serve as master tracking devices.

In various embodiments, the tracking device 10 includes the RFID device 70 communicating with one or more RFID tags for communicating and/or tracking an asset associated with the one or more RFID tags. In other embodiments, the tracking device 10 may use any suitable method or system for communicating and/or tracking an asset. Some examples include (but are not limited to), NFC systems, proximity systems, active and passive RFID, wireless sensor networks, smart labels, and/or the like.

Various embodiments are directed to tracking devices in a collaborative network. In other embodiments, any device or node in a network may be configured to dynamically determine whether to change its role (e.g., from client to master, master to client, master to super-master, super-master to master, super-master to client, etc.)

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. Such hardware, software, firmware, or any combination thereof may part of or implemented with any one or combination of the server 30 (refer to FIG. 1), the tracking device 10 (refer to FIGS. 1-2), components thereof, and/or the like. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A collaborative method for a first node, the method comprising:
   connecting the first node in a local network with at least one other node using a low power subsystem of the first node;

enabling the first node as a first master node from among the local network based on a first set of criteria;

activating, in response to the enabling, a high power subsystem of the first master node for communicating over a wireless wide area network (WWAN);

communicating with a back end server over the WWAN using the high power subsystem of the first node;

disabling the first node as the first master node based on a second set of criteria; and deactivating, in response to the disabling, the high power subsystem of the first node while maintaining operation of the low power subsystem of the first node;

wherein a second master node may be selected from the local network for communicating with the back end server;

wherein the second set of criteria includes at least one of (i) a WWAN condition and (ii) a transition cost of changing a power state of the high power subsystem.

2. The method of claim 1, wherein the communicating is via at least the master node.

3. The method of claim 1, wherein the first master node communicates with the back end server via another master node.

4. The method of claim 1, wherein the first set of criteria is the second set of criteria.

5. The method of claim 1, wherein the second set of criteria includes remaining battery life of each of the nodes.

6. The method of claim 1, wherein a protocol for communicating over the WWAN is selected based on a third set of criteria.

7. The method of claim 6, wherein the third set of criteria includes at least one of WWAN load, WWAN availability, WWAN channel bandwidth, WWAN code availability, WWAN time utilization, quality of WWAN link, and number of nodes allowed to participate in the WWAN.

8. The method of claim 1, wherein the first set of criteria includes at least one of: WWAN load, WWAN availability, WWAN channel bandwidth, WWAN code availability, WWAN time utilization, quality of at least one link in at least one subsystem, type of WWAN protocol, remaining battery life, a cost associated with data collection process from a collection of objects, a transition cost of changing power states in at least one subsystem, energy efficiency, number of nodes allowed to participate in the WWAN, and number of nodes allowed to participate in the local network.

9. The method of claim 8, the method further comprising:
receiving the WWAN load in a system information block.

10. The method of claim 8, wherein the number of nodes allowed to participate in the WWAN is specified by at least one of the WWAN and the back end server.

11. The method of claim 1, wherein first the master node receives data from non-master nodes of the local network.

12. The method of claim 11, wherein the first master node transmits, either directly or through at least another master node, at least the data received from the non-master nodes of the local network to the back end server.

13. The method of claim 1, wherein the first master node receives data from a master node of a different local network.

14. The method of claim 13, wherein the first master node transmits, either directly or through at least another master node, at least the data received from the master node of the different local network to the back end server.

15. The method of claim 1, wherein the master node receives partial data from a master node of a different local network.

16. The method of claim 15, wherein the master node transmits, either directly or through at least another master node, at least the partial data received from the master node of the different local network to the back end server.

17. The method of claim 16, wherein the partial data is compressed.

18. The method of claim 16, wherein the partial data indicates presence.

19. The method of claim 1, the method further comprising:
selecting a super-master node from among the first master node and at least one other master node based on a third set of criteria, the super-master node for communicating with the back end server over the WWAN using the high power subsystem.

20. The method of claim 19, wherein the third set of criteria includes at least one of: WWAN load, WWAN availability, WWAN channel bandwidth, WWAN code availability, WWAN time utilization, quality of at least one link in at least one subsystem, type of WWAN protocol, remaining battery life, a cost associated with data collection process from a collection of objects, a transition cost of changing power states in at least one subsystem, energy efficiency, number of nodes allowed to participate in the WWAN, and number of nodes allowed to participate in the local network.

21. The method of claim 19, wherein a protocol for communicating over the WWAN is selected based on a fourth set of criteria.

22. The method of claim 21, wherein the fourth set of criteria includes at least one of WWAN load, WWAN availability, WWAN channel bandwidth, WWAN code availability, WWAN time utilization, quality of WWAN link, and number of nodes allowed to participate in the WWAN.

23. The method of claim 20, the method further comprising:
receiving the WWAN load in a system information block.

24. The method of claim 20, wherein the number of nodes allowed to participate in the WWAN is specified by at least one of the WWAN and the back end server.

25. The method of claim 1, wherein the deactivated high power subsystem of the first node prevents the first node from communicating over the WWAN.

26. The method of claim 1, further comprising:
selecting, based on the second set of criteria, another node from the local network as the second master node.

27. The method of claim 1, wherein the WWAN condition comprises at least one of WWAN load, WWAN availability, WWAN channel bandwidth, WWAN time utilization, WWAN link quality, and type of WWAN protocol.

28. The method of claim 1, wherein the second set of criteria includes a number of nodes allowed to participate in a network.

29. The method of claim 28, wherein the number of nodes in a network comprise at least one of a number of nodes allowed to participate in the WWAN and a number of nodes allowed to participate in the local network.

30. The method of claim 1, wherein the second set of criteria includes remaining battery life of the first node, the WWAN condition with respect to the first node, and the transition cost of changing the power state of the high power subsystem of the first node.

31. The method of claim 27, the method further comprising:
receiving the WWAN load in a system information block.

32. The method of claim 29, wherein the number of nodes allowed to participate in the WWAN is specified by at least one of the WWAN and the back end server.

33. The method of claim 1, further comprising maintaining connection with the local network using the low power subsystem after deactivating the high power subsystem of the first node.

34. The method of claim 1, further comprising transmitting data to the second master node after deactivating the high power subsystem of the first node.

35. The method of claim 1, wherein the second master node communicates with the back end server over the WWAN using a high power subsystem of the second master node.

36. A collaborative method for a first node, the method comprising:
   connecting the first node in a local network with at least one other node using a low power subsystem of the first node;
   enabling the first node as a first master node from among the local network based on a first set of criteria;
   activating, in response to the enabling, a high power subsystem of the first master node for communicating over a wireless wide area network (WWAN);
   communicating with a back end server over the WWAN using the high power subsystem of the first node;
   disabling the first node as the first master node based on a second set of criteria; and
   deactivating, in response to the disabling, the high power subsystem of the first node while maintaining operation of the low power subsystem of the first node;
   wherein a second master node may be selected from the local network for communicating with the back end server;
   wherein the first set of criteria and the second set of criteria includes remaining battery life of each of the nodes and a WWAN condition with respect to each of the nodes for each of the nodes.

37. A collaborative method for a first node, the method comprising:
   connecting the first node in a local network with at least one other node using a low power subsystem of the first node;
   enabling the first node as a first master node from among the local network based on a first set of criteria;
   activating, in response to the enabling, a high power subsystem of the first master node for communicating over a wireless wide area network (WWAN);
   communicating with a back end server over the WWAN using the high power subsystem of the first node;
   disabling the first node as the first master node based on (i) a transition cost of changing a power state of one or more of the first master node and a second master node and (ii) a second set of criteria; and
   deactivating, in response to the deselecting disabling, the high power subsystem of the first node while maintaining operation of the low power subsystem of the first node;
   wherein a second master node may be selected from the local network for communicating with the back end server.

38. A collaborative method for a first node, the method comprising:
   connecting the first node in a local network with at least one other node using a low power subsystem of the first node;
   enabling the first node as a first master node from among the local network based on a first set of criteria;
   activating, in response to the enabling, a high power subsystem of the first master node for communicating over a wireless wide area network (WWAN);
   communicating with a back end server over the WWAN using the high power subsystem of the first node;
   disabling the first node as the master node when energy efficiency of a second node as the master node exceeds energy efficiency of the first node remaining as the master node; and
   deactivating, in response to the disabling, the high power subsystem of the first node while maintaining operation of the low power subsystem of the first node;
   wherein the second master node may be selected from the local network for communicating with the back end server;
   wherein the efficiency of the first node remaining as the master node is based on remaining battery life of the first node and a link quality of the first node with the WWAN; and
   wherein the efficiency of the second node as the master node is based on remaining battery life of the second node, a link quality of the second node with the WWAN, and a transition cost of changing a power state of the high power subsystem of one or more of the first node and the second node.

* * * * *